United States Patent
Verakas

[11] 3,874,504
[45] Apr. 1, 1975

[54] CHEMICAL THERMAL PACK
[76] Inventor: John P. Verakas, 3210 Industrial 33rd St., Fort Pierce, Fla. 33450
[22] Filed: May 24, 1973
[21] Appl. No.: 363,547

Related U.S. Application Data
[63] Continuation-in-part of Ser. No. 201,147, Nov. 22, 1971, abandoned.

[52] U.S. Cl.................... 206/219, 62/4, 126/263, 128/403
[51] Int. Cl............................................ B65d 79/00
[58] Field of Search ............ 206/219, 484; 128/402, 128/403; 126/263; 62/4

[56] References Cited
UNITED STATES PATENTS

| | | | |
|---|---|---|---|
| 3,175,558 | 3/1965 | Caillouette | 128/403 |
| 3,463,161 | 8/1969 | Andrassy | 128/403 X |
| 3,545,230 | 12/1970 | Morse | 62/530 |
| 3,643,665 | 2/1972 | Caillouette | 128/403 |
| 3,674,134 | 7/1972 | Turner | 206/219 |

*Primary Examiner*—Donald F. Norton
*Attorney, Agent, or Firm*—Oltman and Flynn

[57] ABSTRACT

A chemical thermal pack which in the preferred embodiment has a sealed intermediate envelope filled with a powder that produces or absorbs heat when dissolved in water and a quantity of water separated from the powder by a membrane that may be ruptured readily. A relatively flat, sealed, flexible outer pouch slidably receives the filled intermediate envelope and a heat insulation sheet that is located along the inside of one major face of the pouch to retard heat transfer there when the pouch is squeezed manually to rupture the membrane. An insulated pack containing gel is also provided.

6 Claims, 4 Drawing Figures

3,874,504

CHEMICAL THERMAL PACK

RELATED APPLICATION

This application is a continuation-in-part of copending application Ser. No. 201,147 filed Nov. 22, 1971 by the present inventor, now abandoned.

BACKGROUND OF THE INVENTION

Various chemical thermal packs have been proposed heretofore which contain a suitable liquid solvent, principally water, and a quantity of particulate material that absorbs heat or produces heat when dissolved in that liquid. These ingredients may be packaged in a flexible sealed pouch, with the liquid solvent segregated from the powder by a membrane that ruptures when the pouch is manually squeezed deliberately. When the solvent and powder mix with each other, the powder either produces heat or absorbs heat, depending upon its composition.

As one example of a heat-producing thermal pack, as disclosed in my U.S. Pat. No. 3,328,136, a suitable heat-producing particulate material may have anhydrous magnesium sulfate as its principal constituent. The liquid solvent for such heat-producing particulate material preferably is at least 90% water, with a few drops of coloring, and the remainder an inorganic salt, such as sodium chloride or potassium chloride, to give the liquid solvent a lower freezing point.

Alternatively, the hot pack may have calcium chloride as the principal ingredient of the heat-producing powder, and water as the solvent.

As an example of a heat-absorbing thermal pack, a suitable heat-absorbing particulate material, as disclosed in U.S. Pat. No. 2,979,463, may have as its principal ingredient urea or a urea compound, as a temperature depressant, along with the following: one or more additional temperature depressants, such as ammonium chloride, potassium chloride, or sodium chloride; one or more heat insulating substances, such as plaster of Paris or asbestos, to prolong the refrigerating effect; one or more water absorbers, such as locust bean gum, and other minor constituents. The liquid solvent for such heat-absorbing particulate material preferably is water with a few drops of coloring.

Alternatively, the cold pack may have ammonium nitrate as the principal ingredient of the heat absorbing powder, and water as the solvent.

A third type of thermal pack, known as a gel pack, can be placed in a hot or cold environment and will stay at a particular temperature when removed from that environment. Such a pack may contain water mixed with urea, potassium chloride and a gum such as locust bean gum. Alternatively a water solution of calcium chloride may be used as the heat or cold sustaining mixture.

Such thermal packs have various uses, such as to warm the hands or warm a baby bottle or food, or to warm or cool an injured or painful part of the body, or in a great number of other situations that arise where a promptly available, localized heating or cooling effect for a limited period of time is desired.

Many such previous thermal packs were not entirely satisfactory from the standpoints of thermal efficiency and convenience of use because the heat transfer action takes place relatively freely at all exposed surfaces of the pack, with a resulting waste of the heating or cooling effect and often personal discomfort to the person holding the pack.

To overcome these deficiencies, it has been proposed heretofore to attach single-layer or multi-layer heat insulation to the outside of thermal packs. Such outside-attached heat insulation arrangements enable the interior of the thermal pack to be constructed substantially as before, but they tend to complicate and increase the cost of manufacture of thermal packs.

SUMMARY OF THE INVENTION

The present invention is directed to a novel and improved chemical thermal pack that has a separate heat insulation sheet slidably received inside a flexible outer pouch. In one embodiment the outer pouch also slidably receives a sealed intermediate envelope containing the separated thermally-reactive ingredients. When the pack is squeezed, a membrane separating these ingredients is ruptured, but the intermediate envelope which encloses them does not rupture and it keeps the mixed ingredients segregated from the insulation sheet inside the outer pouch. In another embodiment, the water and powder are pre-mixed in the envelope to form a gel, and the insulation is located between the envelope and the outer pouch.

It is a principal object of this invention to provide a thermal pack which is heat-insulated at one side in a novel and simplified manner.

Another object of this invention is to provide a thermal pack of novel construction in which a thin flexible sheet of heat insulation material and a sealed envelope containing the thermally reactive ingredients are both enclosed in, and protected by, a flexible, sealed outer pouch.

Further objects and advantages of this invention will be apparent from the following detailed description of a presently-preferred embodiment thereof, which is shown in the accompanying drawings, in which.

Figure 4:
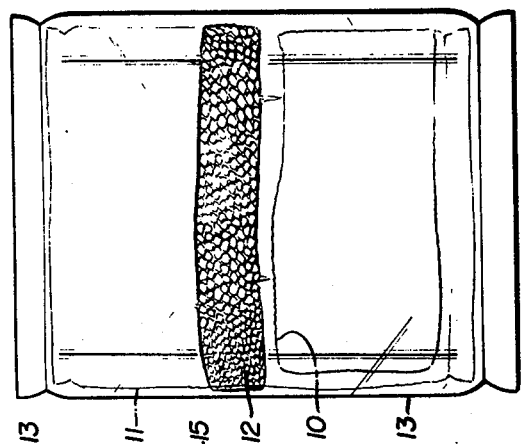
FIG. 4 is an elevational view, broken away to reveal the heat transfer powder, showing this thermal pack after the outer pouch has been sealed.
Figure 3:
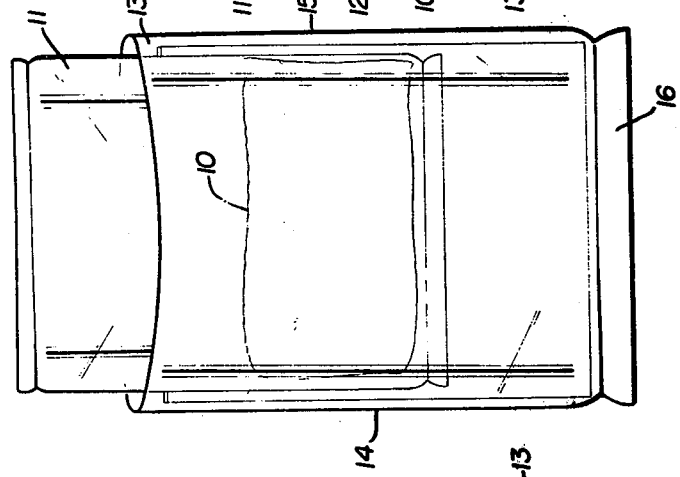
FIG. 3 is a view similar to FIG. 2 and showing the insertion of the sealed intermediate envelope (FIG. 1) into the outer pouch of the thermal pack, either before or after the heat insulation sheet is inserted (FIG. 2)
Figure 2:
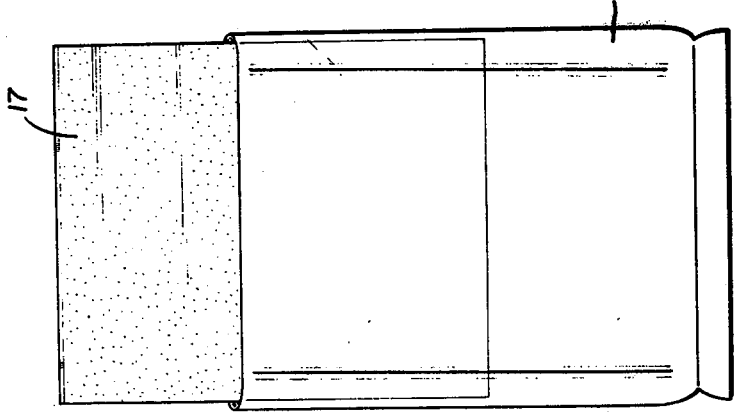
FIG. 2 is an elevational view showing the insertion of a heat insulation sheet into the outer pouch of this thermal pack.
Figure 1:
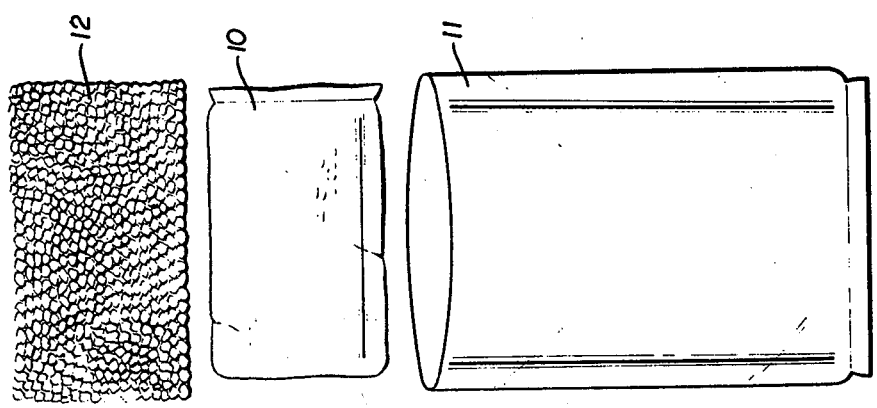
FIG. 1 is an exploded elevational view showing the loose heat-transfer powder, a rupturable inner bag filled with the liquid solvent for this powder, and an intermediate envelope that receives the powder and the filled inner bag in the present thermal pack.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

Also, it is to be understood that the foregoing examples of ingredients for hot packs and cold packs are merely illustrative, and not exhaustive, of the type of liquid solvent and the heat-producing or heat-absorbing particles that may be embodied in a thermal pack in accordance with the present invention.

In the preferred embodiment of this invention the liquid solvent fills a small, sealed, liquid-tight bag 10 of suitable flexible plastic that is relatively easily ruptured by the liquid when squeezed manually. This sealed bag 10 filled with the liquid solvent is inserted in an open-topped intermediate envelope or bag 11, which is about twice as large as the bag 10. The remainder of the intermediate envelope 11 is filled, or substantially filled, with the loose, particulate material 12 which has either heat-absorbing or heat-producing properties when dissolved by the liquid solvent in bag 10. Following this, the top of the intermediate envelope 11 is sealed.

Preferably, both the inner bag 10 and the intermediate envelope 11 are of transparent, flexible plastic, such as polyethylene. Preferably, also, the intermediate envelope 11, after being sealed, is not ruptured ordinarily when squeezed manually. Thus, when such squeezing occurs, the inner bag 10 is ruptured, enabling the liquid solvent to mix with the particulate material 12 and cause the latter to absorb or release heat, depending upon the type of material it is, but the dissolved thermally-reactive mixture remains sealed in the intermediate envelope 11.

After being filled, as described, and before being squeezed to absorb or release heat, the sealed intermediate envelope 11 is slidably inserted into an open-topped outer pouch or envelope 13, that is just slightly larger in size. Preferably, the outer pouch 13, is of flexible, transparent plastic, such as polyethylene, and it is relatively flat, with its opposite major faces joined integrally to one another at the opposite side edges 14 and 15 and sealed to each other along the bottom edge 16.

In accordance with the present invention, a thin, flat, flexible sheet 17 of heat insulation material is inserted into the outer pouch 13 either before or after the insertion of the sealed intermediate envelope 11. This heat insulation sheet may be of fine cell or cross-linked polyethylene or other suitable material, and it extends substantially completely across the inside of one major face of the outer pouch 13 and separates this side of the pouch from the sealed intermediate envelope 11.

After both the insulation sheet 17 and the sealed inner envelope 11 have been inserted, the top of the outer pouch 13 is sealed to provide a liquid-tight package.

Preferably, the outer pouch 13 is of suitable flexible, transparent plastic and, in the absence of a defect, it does not rupture when squeezed manually. The outer pouch 13 constitutes a means for affixing the insulation sheet 17 to envelope 11. The affixing means could take other forms such as adhesive, but the outer pouch is preferred and advantageous. For example, the outer pouch provides extra protection against leakage.

Before using this thermal pack to either heat or cool, the filled outer pouch 13 provides a relatively flat package containing the sealed inner envelope 11 in which the heat transfer particles 12 are segregated from the liquid solvent by the rupturable membrane constituted by the inner bag 10.

To put the thermal pack into use, it is squeezed manually enough to rupture the inner bag 10, so that the liquid solvent in the latter can mix with, and dissolve, the particulate heat transfer material 12 and thereby cause a heat transfer action, either heating or cooling, depending upon the composition of this particulate material. The heat insulation sheet 17 just inside one major face of the outer pouch 13 substantially retards this heat transfer action from taking place there, and instead forces substantially all of the significant heat transfer to take place at the opposite major face of the outer pouch. In most instances, this heat transfer at substantially only one side of the pouch is more effective and convenient, as compared to having heat transfer taking place on both sides of the pouch. Also, the insulation sheet 17 keeps that side of the pouch at a comfortable temperature, neither too hot nor too cold, so that this side of the pouch may be held without discomfort for as long as necessary. Moisture will not condense at the insulated side.

The outer pouch 13 provides a durable protective enclosure for both the insulation sheet 17 and the filled intermediate envelope 11, so that neither is likely to be ruptured or otherwise damage before or during the use of this thermal pack. Also, as described, both the insulation sheet 17 and the filled intermediate envelope 11 are readily conveniently inserted into the outer pouch 13, so that the assembly of the complete thermal pack is a relatively uncomplicated procedure.

The same pack may utilize a gel composition such as that described previously herein contained in the intermediate bag in place of the water bag and dry chemical. This pack may be placed in a refrigerator to lower it to a cold temperature and the pack will stay at this temperature when removed from the refrigerator. The thermal insulation sheet serves the same purposes as previously described herein.

I claim:

1. In a chemical thermal pack having a flexible, liquid-tight outer pouch, a liquid solvent and particulate material which produces heat or absorbs heat when contacted by said liquid solvent, and a liquid-proof inner bag filled with said liquid solvent and separating it from said particulate material, said inner bag being readily rupturable by said liquid solvent when squeezed manually, the improvement which comprises:

a flexible, liquid-tight intermediate envelope containing said particulate material and the solvent-filled inner bag, said intermediate envelope being slidably received snugly in said outer pouch and being substantially nonrupturable when squeezed manually;

and a thin, flexible sheet of heat insulation material slidably received in said pouch between one side of the pouch and said intermediate envelope.

2. A thermal pack according to claim 1, wherein said pouch has opposite major faces which are joined to each other at the edges of the pouch, and said sheet of insulation material extends substantially completely across one of said major faces at the inside.

3. In a chemical thermal pack having a flexible, liquid-tight outer pouch, a liquid solvent and particulate material which produces heat or absorbs heat when contacted by said liquid solvent, and a liquid-proof inner bag filled with said liquid solvent and separating it from said particulate material, said inner bag being readily rupturable by said liquid solvent when squeezed manually, the improvement which comprises:

a flexible, liquid-tight intermediate envelope containing said particulate material and the solvent-filled inner bag, said intermediate envelope being received snugly in said outer pouch and being substantially nonrupturable when squeezed manually;

and a thin, flexible sheet of heat insulation material slidably received in said pouch between one side of the pouch and said intermediate envelope.

4. A thermal pack according to claim 3, wherein said pouch has opposite major faces which are joined to each other at the edges of the pouch, and said sheet of insulation material extends substantially completely across one of said major faces at the inside.

5. In a chemical thermal pack having a flexible, liquid-tight outer pouch, and chemicals inside said outer pouch which are capable of producing and maintaining an elevated or depressed temperature in said outer pouch and at the outside therof, the improvement which comprises:

a flexible, liquid-tight intermediate envelope containing said chemicals, said intermediate envelope being received snugly in said outer pouch and being substantially nonrupturable when squeezed manually;

and a thin, flexible sheet of heat insulation material slidably received in said outer pouch between one side of the pouch and said intermediate envelope.

6. A thermal pack according to claim 5, wherein said chemicals are in the form of a gel.

* * * * *